United States Patent
Lee et al.

(10) Patent No.: US 8,792,020 B2
(45) Date of Patent: Jul. 29, 2014

(54) METHOD AND APPARATUSES FOR PEDESTAL LEVEL COMPENSATION OF ACTIVE SIGNAL GENERATED FROM AN OUTPUT SIGNAL OF A PIXEL IN AN IMAGE SENSOR

(75) Inventors: Kyung Ho Lee, Bucheon-si (KR); Jung Chak Ahn, Yongin-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 249 days.

(21) Appl. No.: 13/248,324

(22) Filed: Sep. 29, 2011

(65) Prior Publication Data
US 2012/0133803 A1    May 31, 2012

(30) Foreign Application Priority Data

Nov. 29, 2010 (KR) .................. 10-2010-0120078

(51) Int. Cl.
*H04N 5/217* (2011.01)

(52) U.S. Cl.
USPC ............ 348/241; 348/243; 348/246; 348/247

(58) Field of Classification Search
USPC ......... 348/241, 243, 246, 247, 294, 298, 302, 348/308
See application file for complete search history.

(56) References Cited

U.S. PATENT DOCUMENTS

| 7,787,034 B2* | 8/2010 | Ying et al. | 348/247 |
| 2008/0239111 A1* | 10/2008 | Jiang | 348/243 |

FOREIGN PATENT DOCUMENTS

| JP | 05-292528 | 11/1993 |
| JP | 2003-143437 | 5/2003 |
| JP | 2004-080168 | 3/2004 |

* cited by examiner

*Primary Examiner* — Yogesh Aggarwal
(74) *Attorney, Agent, or Firm* — Volentine & Whitt, PLLC

(57) ABSTRACT

A pedestal level compensation method includes calculating a dark level difference error depending on temperature, calculating a pedestal level offset depending on an analog gain, and compensating a pedestal level according to the dark level difference error and the pedestal level offset.

18 Claims, 7 Drawing Sheets

METHOD AND APPARATUSES FOR PEDESTAL LEVEL COMPENSATION OF ACTIVE SIGNAL GENERATED FROM AN OUTPUT SIGNAL OF A PIXEL IN AN IMAGE SENSOR

CROSS-REFERENCE TO RELATED APPLICATIONS

This application claims priority under 35 U.S.C. §119(a) from Korean Patent Application No. 10-2010-0120078 filed on Nov. 29, 2010, the disclosure of which is hereby incorporated by reference in its entirety.

BACKGROUND

Embodiments of the present inventive concept relate to an image sensor, and more particularly, to a method for compensating a pedestal level of an active signal generated from an output signal of an active pixel in an image sensor, and apparatuses performing the same.

An image sensor is a device for converting an optical image signal of detected light into an electrical image signal. Examples of image sensors include charge-coupled device (CCD) arrays and complementary metal oxide semiconductor (CMOS) arrays. In general, an image sensor may comprise an array of pixels each of which is configured to produce a pixel output signal representing an amount of light detected by the pixel. A pixel may employ a photosensitive device, such as a photodiode, to generate the output signal in response to received light. The image sensor may employ a detector to detect the pixel output signal produced by each pixel.

In general, an image sensor may employ a dark or black pedestal which adds a certain level to the output signal of each pixel for detection, for example to mask a noise level when little or no light is sensed by a pixel and insure that the detector does not try to detect negative levels due to temporal noise in the pixel in the absence of light. The image sensor determines the pedestal level to be added to the pixel output signal after performing an auto dark level compensation. When the auto dark level compensation operation is performed, a difference between a dark level of an active signal and a dark level of an optical black signal causes an offset of a pedestal level. In addition, the pedestal level varies according to an analog gain and an exposure time.

SUMMARY

The present general inventive concept provides a compensation method of a pedestal level of an active signal generated from an output signal of a pixel in an image sensor, and apparatuses performing the same.

An embodiment of the present invention is directed to a pedestal level compensation method. The method includes: calculating a dark level difference error, corresponding to an operating temperature, based on: (1) a first dark level difference between a dark level for an active pixel of an image sensor and a dark level of an optical black pixel of the image sensor at a reference temperature, and (2) a second dark level difference between a dark level for the active pixel and a dark level of the optical black pixel at an operating temperature; calculating a pedestal level offset corresponding to an analog gain that is applied to an active signal generated from an output signal of the active pixel; and compensating a pedestal level that is applied to the active signal according to the dark level difference error and the pedestal level offset.

In some embodiments, calculating the dark level difference error may include: storing in a memory the first dark level difference; detecting the operating temperature, looking up in a look up table a dark level difference ratio and calculating the dark level difference error for the operating temperature by using the first dark level difference and the dark level difference ratio.

In some embodiments, the first memory may comprise a one-time programmable (OTP) memory.

In some embodiments, calculating a pedestal level offset corresponding to the analog gain that is applied to the active signal includes storing in a memory device a reference pedestal level offset ratio for a reference analog gain value and calculating the pedestal level offset depending on the analog gain that is applied to the active signal by using the reference pedestal level offset ratio stored in the second memory and the analog gain that is applied to the active signal. In some embodiments, the second memory may comprise a one time programmable (OTP) memory.

An example embodiment of the present invention is directed to a device. The device includes: a pixel array including an active pixel, which is configured to generate an active signal corresponding to incident light, and an optical black pixel generating an optical black signal, wherein the optical black pixel does not sense the incident light; an auto dark level compensation block configured to compensate a dark level of the active pixel by using the active signal and the optical black signal and outputting a compensated active signal which has a pedestal level that is compensated for: (1) a dark level difference error corresponding to an operating temperature of the device, and (2) a pedestal level offset corresponding to an analog gain that is applied to the active signal; and a processor configured to calculate the dark level difference error and the pedestal level offset, and to compensate a pedestal level according to the dark level difference error and the pedestal level offset.

In some embodiments, the processor includes a first memory configured to store a first dark level difference which is a difference between the dark level of the active pixel and a dark level of the optical black pixel at a reference temperature, a second memory configured to store a look-up table for looking up a dark level difference ratio which is a ratio of a second dark level difference to the first dark level difference at different operating temperatures, and an image signal processor configured to calculate the dark level difference error corresponding to the operating temperature by using the first dark level difference and the dark level difference ratio. The second dark level difference is a difference between a dark level of the active pixel and a dark level of the optical pixel at the operating temperature.

According to an example embodiment, the device further includes a temperature detector configured to detect the operating temperature.

The processor further including a third memory configured to store a reference pedestal level offset ratio corresponding to a reference analog gain, and the image signal processor calculates the pedestal level offset corresponding to the analog gain that is applied to the active signal by using the reference pedestal level offset ratio stored in the third memory and the analog gain that is applied to the active signal. Each of the first memory and the third memory may comprise a one time programmable OTP memory.

An example embodiment of the present invention is directed to a method of operating an image sensor including a pixel array having an active pixel region with an active pixel, and an optical black pixel region with an optical black pixel. The method comprises: calculating a dark level difference error corresponding to an operating temperature of the pixel array; calculating a pedestal level offset corresponding to an analog gain that is applied to an active signal generated from an output signal of the active pixel; and performing an automatic dark level compensation of the active signal by applying a pedestal to the active signal, wherein a pedestal level of the pedestal that is applied to the active signal is compensated to account for the dark level difference error and the pedestal level offset.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
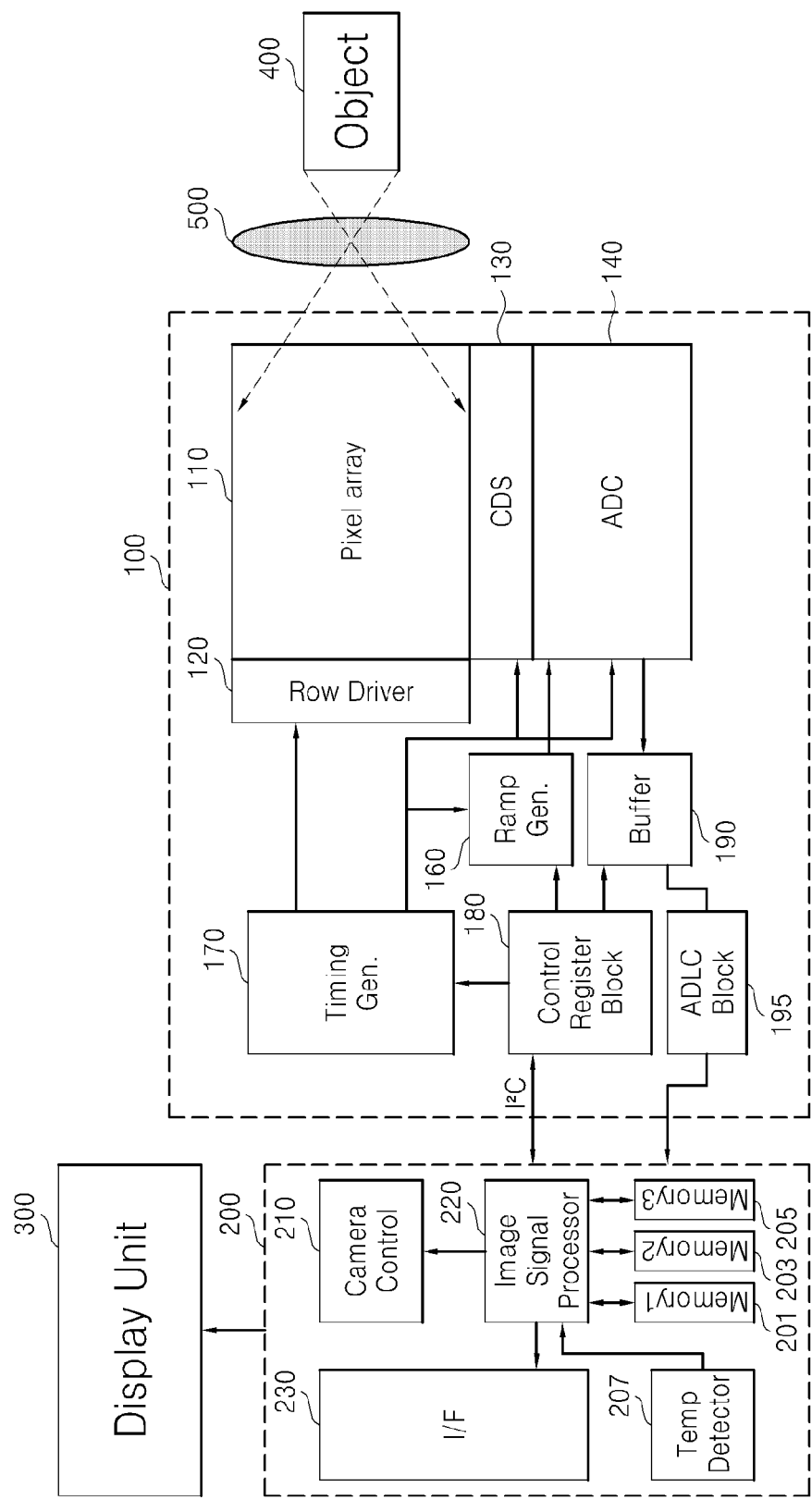
FIG. 1 is a schematic block diagram of an image sensing system including an image sensor according to an example embodiment of the present invention.

Exemplary embodiments now will be described more fully hereinafter with reference to the accompanying drawings. The exemplary embodiments may, however, be embodied in many different forms and should not be construed as limited to the embodiments set forth herein. Rather, these embodiments are provided so that this disclosure will be thorough and complete. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which the exemplary embodiments belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 2:
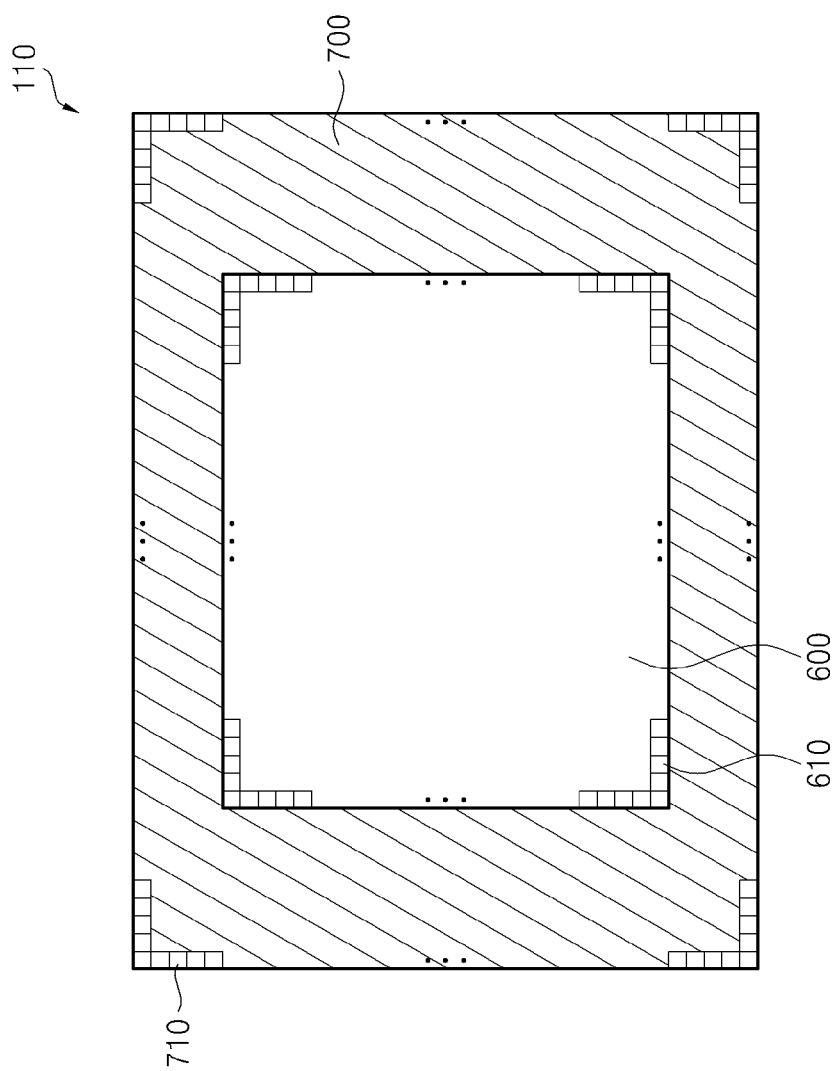
FIG. 2 displays a plane diagram of a pixel array illustrated in FIG. 1.

FIG. 1 is a schematic block diagram of an image sensing system including an image sensor according to an example embodiment of the present invention, and FIG. 2 displays a plane diagram of a pixel array illustrated in FIG. 1.

The image sensing system of FIG. 1 includes, among other things, an image sensor 100 includes a pixel array 110, a row driver 120, a correlated double sampling (CDS) block 130, an analog to digital converter (ADC) 140, a ramp generator 160, a timing generator 170, a control register block 180, a buffer 190 and an auto dark level compensation (ADLC) block 195.

Referring to FIG. 2, a pixel array 110 includes an active pixel region 600 and an optical black pixel region 700. Active pixel region 600 includes a plurality of active pixels 610. Each of the plurality of active pixels 610 generates an active pixel output signal in response to sensed light. Each of the plurality of active pixels 610 may include a color filter for passing specific wavelengths of light, in which case the active pixel 610 generates an active pixel output signal corresponding to sensed light within the specific wavelengths. For example, the color filter may include a red filter which allows wavelengths of a red region of the visible light spectrum to pass therethrough, a green filter which allows wavelengths of a green region of the visible light spectrum to pass therethrough, or a blue filter which allows wavelengths of a blue region of the visible light spectrum to pass therethrough. According to another example embodiment, the color filter may include at least one of a cyan filter, a yellow filter and a magenta filter.

The optical black pixel region 700 includes a plurality of optical black pixels 710. Each of the plurality of optical black pixels 710 generates an optical black signal having a dark level wherein an incident light is prevented from being sensed by optical black pixels 710.

Each of the plurality of active pixels 610 may include an optical sensing element, e.g., a photo diode, a pinned photo diode or a photo gate. According to example embodiments, each of the plurality of optical black pixels 710 may or may not include the optical sensing element.

Control register block 180 may generate at least a control signal for controlling one or more operations of ramp signal generator 160, timing generator 170 and buffer 190. Here, the control register block 180 may operate under a control of a camera controller 210 as shown in FIG. 1. Camera controller 210 may comprise hardware, software driving the hardware, or some combination thereof. Row driver 120 drives pixel array 110 row by row. For example, the row driver 120 may generate a row selection signal for selecting one of a plurality of rows of pixel array 110.

Each of the plurality of active pixels 610 output an active reset signal and an active signal to CDS 130 by sensing an incident light. Additionally, each of the plurality of optical black pixels 710 outputs an optical black reset signal and an optical black signal to CDS 130. The CDS 130 may perform a correlated double sampling on each of a received active reset signal and a received active signal. In addition, CDS 130 may perform a correlated double sampling on each of a received optical black reset signal and a received optical black signal.

ADC 140 may: compare a ramp signal generated by the ramp signal generator 160 with each of correlated double sampled pixel output signals output from the CDS 130; output a plurality of comparison signals each indicating a comparison result between a corresponding one of the correlated double sampled pixel output signals and the ramp signal; count a time interval (e.g., a number of clock cycles or periods) for each of the comparison signals until the corresponding comparison signal changes polarity (e.g., goes from zero or negative to positive), indicating the time interval required for the ramp signal to reach the level of the corresponding correlated double sampled pixel output signal; and output each of the count values to buffer 190.

Buffer 190 may temporarily store a plurality of digital active signals and a plurality of digital optical black signals output from ADC 140 and output them by sensing and amplifying them. For example, each of the plurality of digital active signals and each of the plurality of digital optical black signals may correspond to each of the count values.

The digital active signals each include a dark level induced by a leakage current of a photo diode, a pinned photo diode or a photo gate employed in each active pixel.

Auto dark level compensation block 195 may compensate for a dark level of the plurality of digital active signals induced by the leakage current, by using the plurality of digital optical black signals for a dark level compensation. Moreover, to prevent temporal noise clipping of a plurality of digital active signals, an offset (a black level or a pedestal level) may be added to the digital active signals during an auto dark level compensation operation However, a difference between a dark level of a digital optical black signal and a dark level of a digital active signal may be generated as a result of a change in a manufacturing process or a difference of structure. Furthermore, for example, this difference may change depending on temperature, which may be referred to as a "dark level difference error" ($\Delta DL_{ERROR}$).

Also, the pedestal level changes variously according to an analog gain that is applied to the digital active signals.

Figure 3:
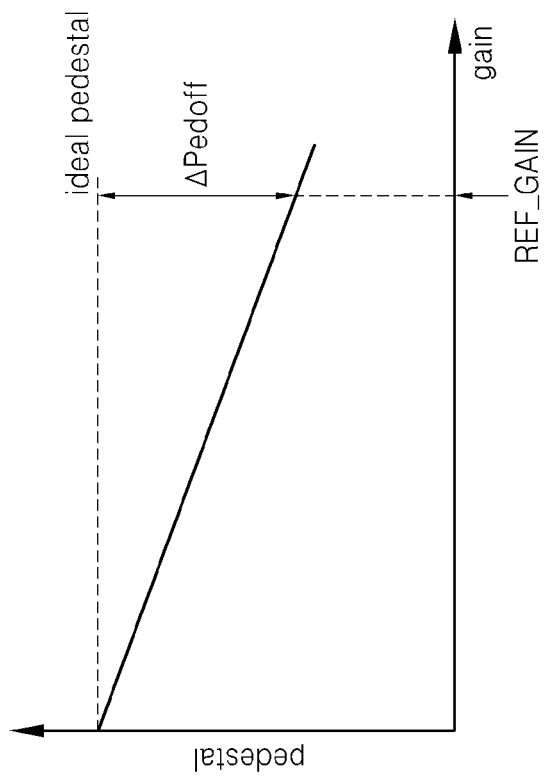
FIG. 3 is a graph displaying a pedestal level depending on analog gain.

FIG. 3 is a graph displaying variation in a pedestal level as a function of an analog gain. Referring to FIG. 3, a dotted line displays an ideal pedestal level and a solid line displays a real pedestal level as the analog gain is increased. According to the increase in the analog gain, a pedestal level offset ($\Delta$Pedoff) is generated between the ideal pedestal level and the real pedestal level at a specific gain (REF_GAIN). Here, an integration time is minimized to calibrate an offset independent from temperature and integration time.

To account for the dark level difference error $\Delta DL_{ERROR}$ at a particular operating temperature, and the pedestal level offset $\Delta$Pedoff at a particular analog gain, the pedestal level should be compensated.

Image sensor 100 may sense an object 400 photographed through a lens 500 according to a control of a digital signal processor (DSP) 200 as shown in FIG. 1, and DSP 200 may output image signals, which are sensed and output by the image sensor, to a display unit 300. Here, display unit 300 may be any kind of device that outputs or displays image signals. For example, display unit 300 may include a computer, a mobile communication device, and other image output terminals.

As shown in FIG. 1, DSP 200 includes a plurality of memories 201, 203 and 205, camera controller 210, an image signal processor (ISP) 220 and an interface (I/F) 230. According to an example embodiment, the plurality of memories 201, 203 and 205 may be embodied in a memory device. DSP 200 may calculate a dark level difference error $\Delta DL_{ERROR}$, calculate a pedestal level offset $\Delta$Pedoff, and compensate a pedestal level according to the dark level difference error $\Delta DL_{ERROR}$ and the pedestal level offset $\Delta$Pedoff.

Figure 4:
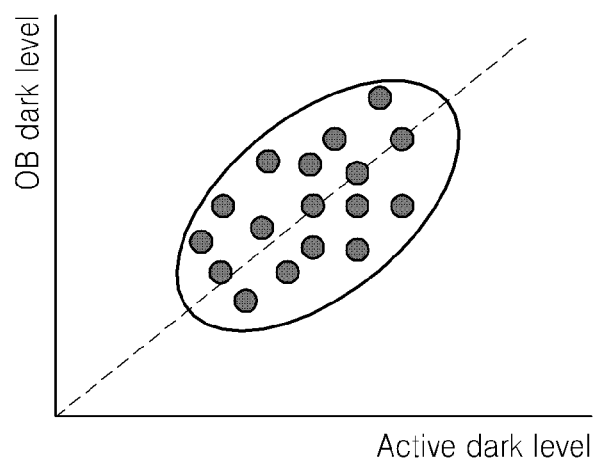
FIG. 4 is a graph displaying distribution of dark levels of an optical block pixel against dark levels of an active pixel.

FIG. 4 is a graph displaying a distribution of dark levels of an optical black pixel against dark levels of an active pixel by electrical die sorting (EDS).

FIG. 4 plots various values of a dark level of an optical black pixel against values of a dark level of an active pixel at a reference temperature, e.g., 75° C. That is, a dark level of an optical black pixel forms a distribution against a dark level of an active pixel at a reference temperature, e.g., 75° C.

Referring to FIG. 1, first memory 201 stores a difference between a dark level of an active pixel 610 and a dark level of an optical black pixel 710, i.e., a first dark level difference ($\Delta DL$), at a reference temperature, e.g., 75° C. According to an example embodiment, the first memory 201 may be embodied in a one-time programmable (OTP) memory. In other embodiments, the first memory 201 may be embodied in a non-volatile memory.

A temperature detector 207 detects an operating temperature for calibrating a dark level according to the operating temperature. According to an example embodiment, temperature detector 207 may be embodied external to DSP 200. Second memory 203 stores a look-up table for looking up a dark level difference ratio, i.e., a ratio between a second dark level difference ($\Delta DL'$) at the operating temperature, and a first dark level difference ($\Delta DL$) at the reference temperature. A dark level difference ratio ($\Delta DL'/\Delta DL$) may be described by equation (1):

$$\frac{\Delta DL'}{\Delta DL} = \left(\frac{T}{Tref}\right)^3 * \exp\left[-\frac{Eg}{k}\left(\frac{1}{T} - \frac{1}{Tref}\right)\right] \quad (1)$$

Tref indicates a reference temperature (e.g., 75° C., T indicates a particular operating temperature (in general, different from the reference temperature), Eg indicates a bandgap of silicon and k indicates Boltzmann's constant. A second dark level difference ($\Delta DL'$) is the difference between a dark level of the active pixel 610 and a dark level of the optical pixel 700 at the operating temperature T.

IPS 220 calculates a dark level difference error $\Delta DL_{ERROR}$ depending on the operating temperature T by using the first dark level difference ($\Delta DL$) and the dark level difference ratio ($\Delta DL'/\Delta DL$).

Third memory 205 stores data from which the pedestal level offset $\Delta$Pedoff can be calculated for a particular analog gain that is applied to the active signal. In one or more embodiments, third memory 205 may store data that represents a reference pedestal level offset ratio, $\Delta$Pedoff/REF_GAIN, which is a ratio between: (1) a reference pedestal offset value, $\Delta$Pedoff$_{REF}$ that corresponds to a reference analog gain value REF_GAIN, and (2) the reference analog gain value REF_GAIN. In one or more embodiments, third memory 205 may store the reference pedestal level offset value $\Delta$Pedoff$_{REF}$ itself.

ISP 220 calculates a pedestal level offset ΔPedoff corresponding to the analog gain that is applied to the active signal by using the reference pedestal level offset ratio ΔPedoff/REF_GAIN stored in third memory 205 and the analog gain that is applied to the active signal. According to an example embodiment, third memory 205 may comprise a one-time programmable OTP memory. Third memory 205 may also comprise a non-volatile memory.

ISP 220 receives an image data output from auto dark level compensation block 195, processes a received image data, and outputs a processed data to display unit 300 through I/F 230. For example, ISP 220 may calculate a dark level difference error $\Delta DL_{ERROR}$ and a pedestal level offset ΔPedoff, and compensate a pedestal level according to the dark level difference error $\Delta DL_{ERROR}$ and the pedestal level offset ΔPedoff.

It is illustrated in FIG. 1 that ISP 220 is located internal to DSP 200. However, ISP 220 may be located inside image sensor 100 according to an example embodiment. In addition, image sensor 100 and ISP 220 may be embodied in a package, e.g., a multi-chip package (MCP). Camera controller 210 may control an operation of control register block 180. In some embodiments, camera controller 210 may control an operation of image sensor 100, i.e., control register block 180, by using an inter-integrated circuit 12C, however, the present invention is not restricted thereto.

Figure 5:
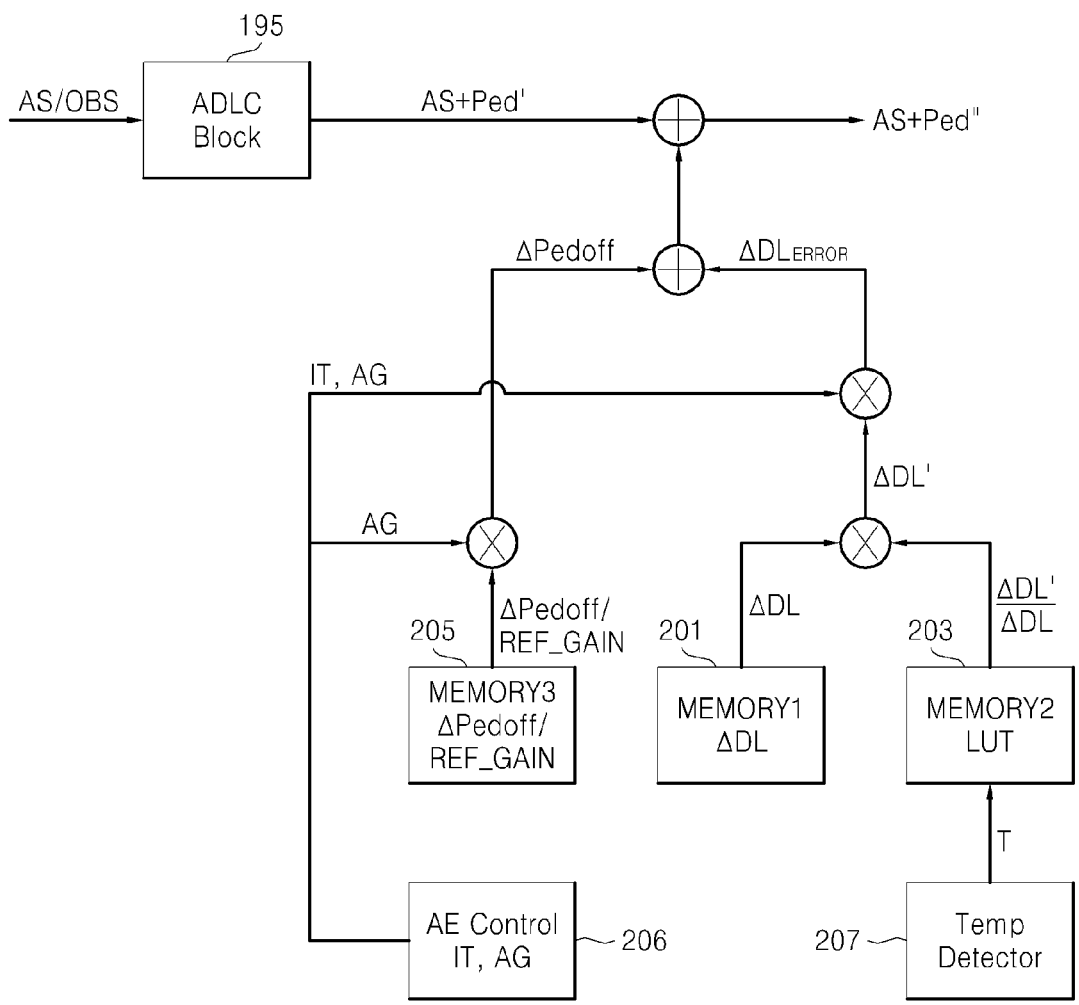
FIG. 5 displays a signal processing block diagram of a digital signal processor illustrated in FIG. 1.

FIG. 5 displays a signal processing block diagram of a digital signal processor illustrated in FIG. 1. Referring to FIGS. 1 to 5, auto dark level compensation block 195 compensates a dark level of an active signal by using an active signal (AS) and an optical black signal (OBS). Here, as explained above, a pedestal level Ped' is added during an auto dark level compensation operation to prevent temporal noise clipping of the active signal AS.

The pedestal level Ped' varies according to a dark level difference error $\Delta DL_{ERROR}$ of an active signal AS and an optical black signal OBS and a pedestal level offset ΔPedoff depending on an analog gain that is applied to the active signal, so that the pedestal level Ped' should be revised. Accordingly, the DSP 200 compensates the pedestal level Ped' according to the dark level difference error $\Delta DL_{ERROR}$ and the pedestal level offset ΔPedoff.

To calculate the dark level difference error $\Delta DL_{ERROR}$, the temperature detector 207 detects an operating temperature T of image sensor 100 or DSP 200. ISP 220 uses the operating temperature to look up a ratio of the second dark level difference ΔDL' to the first dark level difference ΔDL, i.e., the dark level difference ratio ΔDL'/ΔDL, in a look-up table (LUT) stored in second memory 203.

The first dark level difference ΔDL is the difference between a dark level of an active pixel 610 and a dark level of an optical black pixel 710 at a reference temperature (e.g., 75° C.) and the second dark level difference ΔDL' is difference between a dark level of the active pixel 610 and a dark level of the optical pixel 710 at a detected operating temperature T.

ISP 220 calculates the second dark level difference ΔDL' by using the first dark level difference ΔDL stored in first memory 201 and the dark level difference ratio ΔDL'/ΔDL stored in second memory 203, and calculates a dark level difference error $\Delta DL_{ERROR}$ depending on the operating temperature by using the second dark level difference ΔDL', an integration time (IT) and an analog gain (AG).

The integration time IT and the analog gain AG are output by an auto exposure AE control which is one of operations of DSP 200.

A reference pedestal level offset ratio, ΔPedoff/REF_GAIN is stored in third memory 205 to calculate the pedestal level offset ΔPedoff. Here, an integration time is minimized to calibrate an offset independent from temperature and integration time.

ISP 220 calculates the pedestal level offset (ΔPedoff) for a particular analog gain AG that is applied to the active signal by multiplying the pedestal level offset ratio ΔPedoff/REF_GAIN stored in third memory 205 and the analog gain AG that is applied to the active signal. ISP 220 compensates the pedestal level Ped' by using the dark level difference error $\Delta DL_{ERROR}$ and the pedestal level offset ΔPedoff. That is, ISP 220 outputs processed image data to display unit 300 through interface 230 by using a compensated pedestal level (Ped").

Figure 6:
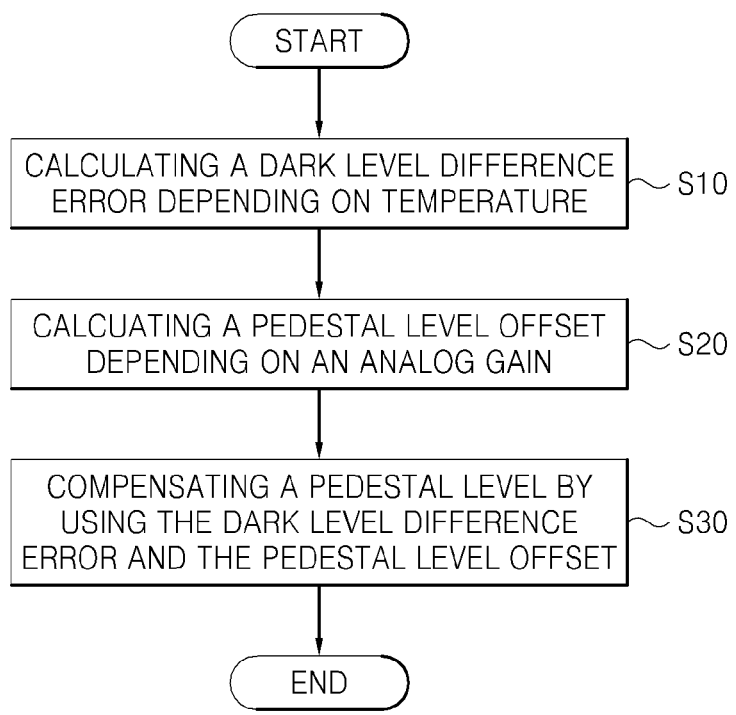
FIG. 6 is a flowchart displaying an operation method of an image sensor according to an example embodiment of the present invention.

FIG. 6 is a flowchart displaying an operating method of an image sensor according to an example embodiment of the present invention. Referring to FIGS. 1 to 6, ISP 200 calculates a dark level difference error $\Delta DL_{ERROR}$ depending on the operating temperature (S10). That is, ISP 220 calculates the second dark level difference ΔDL' by using the first dark level difference (ΔDL) stored in first memory 201, and the dark level difference ratio (ΔDL'/ΔDL) stored in second memory 203, and calculates the dark level difference error $\Delta DL_{ERROR}$ depending on the operating temperature by using the second dark level difference ΔDL', an integration time IT, and an analog gain AG.

ISP 200 calculates a pedestal level offset ΔPedoff for a particular an analog gain (S20). In some embodiments, ISP 220 calculates the pedestal level offset ΔPedoff corresponding to a particular analog gain that is applied to the active signal by using the reference pedestal level offset ratio ΔPedoff/REF_GAIN stored in third memory 205 and the analog gain AG that is applied to the active signal. ISP 200 compensates the pedestal level according to the dark level difference error $\Delta DL_{ERROR}$ and the pedestal level offset ΔPedoff (S30).

Figure 7:
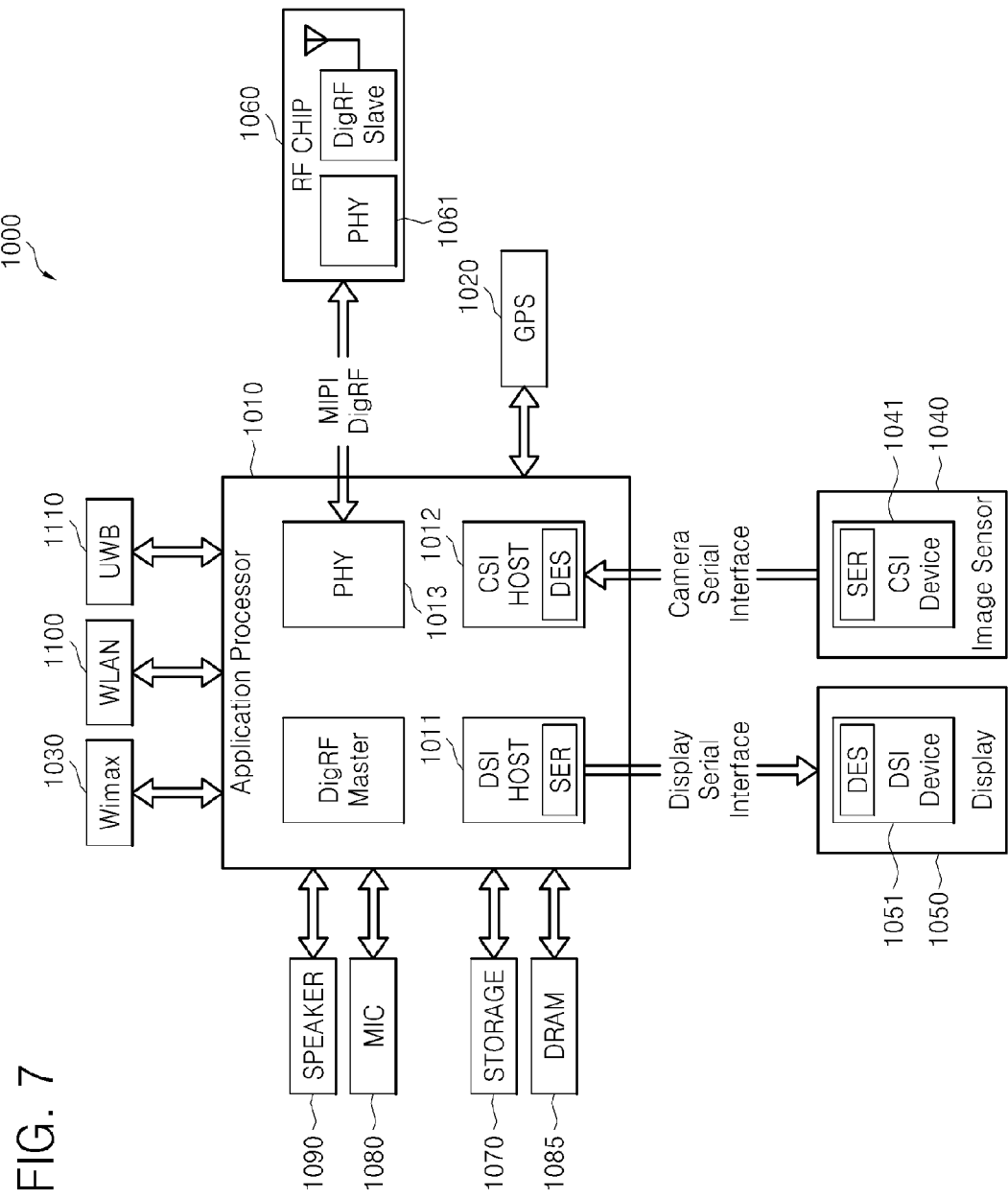
FIG. 7 displays a schematic block diagram of another image sensing system including an image sensor according to an example embodiment of the present invention.

FIG. 7 displays a schematic block diagram of another image sensing system including an image sensor according to an example embodiment of the present invention. Referring to FIG. 7, an image sensing system 1000 may be embodied in a data processing device using or supporting a mobile industry processor interface (MIPI®), e.g., a cellular phone, a personal digital assistant (PDA), a portable multi-media player (PMP), a tablet personal computer or a smart phone.

The image sensing system 1000 includes an application processor 1010, an image sensor 1040 and a display 1050.

A CSI host 1012 embodied in application processor 1010 may perform a serial communication with a CSI device 1041 of image sensor 1040 through a camera serial interface (CSI). Here, for example, an optical deserializer DES may be embodied in a CSI host 1012 and an optical serializer SER may be embodied in CSI device 1041. Image sensor 1040 may be image sensor 100 as described above with respect to FIGS. 1 to 6.

A DSI host 1011 embodied in application processor 1010 may perform a serial communication with a DSI device 1051 of a display 1050 through a display serial interface (DSI). Here, for example, an optical serializer SER may be embodied in DSI host 1011 and an optical deserializer DES may be embodied in DSI device 1051.

Image sensing system 1000 may further include a radio frequency (RF) chip 1060 communicating with application processor 1010. A physical interface PHY 1013 of the image sensing system 1000 may transmit or receive data with a physical interface PHY 1061 of RF chip 1060 according to an MIPI DigRF standard. Image sensing system 1000 may further include a GPS 1020, a storage device 1070, a microphone 1080, a DRAM 1085 and a speaker 1090. Image sensing system 1000 may communicate by using a Worldwide Interoperability for Microwave Access (Wimax) module 1030, a wireless local area network (WLAN) module 1100 and/or an ultra wide band (UWB) module 1110.

A method of compensating a pedestal level according to an example embodiment of the present invention may compensate a dark level difference between an active signal and an optical black signal depending on an operating temperature, and supply a more accurate pedestal level by compensating a pedestal level for an offset depending on an analog gain.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method, comprising:
    calculating a dark level difference error corresponding to an operating temperature, based on: (1) a first dark level difference between a dark level for an active pixel of an image sensor and a dark level of an optical black pixel of the image sensor at a reference temperature, and (2) a second dark level difference between a dark level for the active pixel and a dark level of the optical black pixel at the operating temperature;
    calculating a pedestal level offset corresponding to an analog gain that is applied to an active signal generated from an output signal of the active pixel; and
    compensating a pedestal level that is applied to the active signal according to the dark level difference error and the pedestal level offset.

2. The method of claim 1, wherein calculating the dark level difference error comprises:
    storing in a memory the first dark level difference;
    detecting the operating temperature;
    looking up in a look up table a dark level difference ratio corresponding to the operating temperature, which is a ratio of the second dark level difference to the first dark level difference; and
    calculating the dark level difference error for the operating temperature by using the first dark level difference and the dark level difference ratio.

3. The method of claim 2, wherein the memory comprises a one-time programmable (OTP) memory.

4. The method of claim 1, wherein calculating the pedestal level offset corresponding to the analog gain that is applied to the active signal comprises:
    storing in a memory device a reference pedestal level offset ratio for a reference analog gain value; and
    calculating the pedestal level offset corresponding to the analog gain that is applied to the active signal by using the reference pedestal level offset ratio and the analog gain that is applied to the active signal.

5. The method of claim 4, wherein the memory comprises a one-time programmable (OTP) memory.

6. A device, comprising:
    a pixel array including an active pixel configured to generate an active signal corresponding to incident light and an optical black pixel generating an optical black signal wherein the optical black pixel does not sense the incident light;
    an auto dark level compensation block compensating a dark level of the active pixel by using the active signal and the optical black signal and outputting a compensated active signal having a pedestal level that is compensated for: (1) a dark level difference error corresponding to an operating temperature of the device, and (2) a pedestal level offset corresponding to an analog gain that is applied to the active signal; and
    a processor configured to calculate the dark level difference error and the pedestal level offset and to compensate the pedestal level according to the dark level difference error and the pedestal level offset.

7. The device of claim 6, wherein the processor comprises:
    a first memory configured to store a first dark level difference, which is a difference between a dark level of the active pixel and a dark level of the optical black pixel at a reference temperature;
    a second memory configured to store a look-up table for looking up a dark level difference ratio which is a ratio of a second dark level difference to the first dark level difference; and
    an image signal processor configured to calculate the dark level difference error corresponding to the operating temperature by using the first dark level difference and the dark level difference ratio,
    wherein the second dark level difference is a difference between the dark level of the active pixel and the dark level of the optical pixel at the operating temperature.

8. The device of claim 7, further comprising a temperature detector configured to detect the operating temperature.

9. The device of claim 7, wherein the processor further comprises a third memory configured to store a reference pedestal level offset ratio corresponding to a reference analog gain value, wherein the image signal processor calculates the pedestal level offset depending on the analog gain that is applied to the active signal by using the reference pedestal level offset ratio stored in the third memory and the analog gain that is applied to the active signal.

10. The device of claim 9, wherein each of the first memory and the third memory may be embodied in a one time programmable (OTP) memory.

11. An image sensing system comprising:
    the image sensor of claim 6; and
    a processor configured to control an operation of the image sensor.

12. The image sensing system of claim 11, wherein the processor comprises:
    a first memory configured to store a first dark level difference, which is a difference between a dark level of the active pixel and a dark level of the optical black pixel at the reference temperature;
    a second memory configured to store a look-up table for looking up a dark level difference ratio which is a ratio of a second dark level difference to the first dark level difference; and
    an image signal processor configured to calculate the dark level difference error for the operating temperature by using the first dark level difference and the dark level difference ratio,
    wherein the second dark level difference is a difference between the dark level of the active pixel and the dark level of the optical black pixel at the operating temperature.

13. The image sensing system of claim 12, further comprising a temperature detector configured to detect the operating temperature.

14. The image sensing system of claim 12, wherein the processor further comprises a third memory configured to store a reference pedestal level offset ratio corresponding to a reference analog gain value, wherein the image signal processor calculates the pedestal level offset depending on the analog gain that is applied to the active signal by using the reference pedestal level offset ratio stored in the third memory, and the analog gain that is applied to the active signal.

15. The image sensing system of claim 14, wherein each of the first memory and the third memory is comprises one time programmable (OTP) memory.

16. A method of operating an image sensor including a pixel array having an active pixel region with an active pixel, and an optical black pixel region with an optical black pixel, the method comprising:
  obtaining an operating temperature of the pixel array;
  calculating a dark level difference error using the operating temperature of the pixel array;
  calculating a pedestal level offset corresponding to an analog gain that is applied to an active signal generated from an output signal of the active pixel; and
  performing an automatic dark level compensation of the active signal by applying a pedestal to the active signal, wherein a pedestal level of the pedestal that is applied to the active signal is compensated to account for the dark level difference error and the pedestal level offset,
  wherein calculating the dark level difference error comprises:
  retrieving from a memory device a first dark level difference between a dark level of the active pixel and a dark level of the optical black pixel at a reference temperature;
  retrieving from a look-up table a dark level difference ratio corresponding to the operating temperature; and
  multiplying the first dark level difference by the dark level difference ratio corresponding to the operating temperature.

17. A method of operating an image sensor including a pixel array having an active pixel region with an active pixel, and an optical black pixel region with an optical black pixel, the method comprising:
  obtaining an operating temperature of the pixel array;
  calculating a dark level difference error using the operating temperature of the pixel array;
  calculating a pedestal level offset corresponding to an analog gain that is applied to an active signal generated from an output signal of the active pixel; and
  performing an automatic dark level compensation of the active signal by applying a pedestal to the active signal, wherein a pedestal level of the pedestal that is applied to the active signal is compensated to account for the dark level difference error and the pedestal level offset,
  wherein calculating the pedestal level offset comprises:
  retrieving from a memory device a reference pedestal level offset ratio for a reference analog gain value; and
  calculating the pedestal level offset corresponding to the analog gain that is applied to an active signal by multiplying the reference pedestal level offset ratio and the analog gain that is applied to an active signal.

18. A method of operating an image sensor including a pixel array having an active pixel region with an active pixel, and an optical black pixel region with an optical black pixel, the method comprising:
  obtaining an operating temperature of the pixel array;
  calculating a dark level difference error using the operating temperature of the pixel array;
  calculating a pedestal level offset corresponding to an analog gain that is applied to an active signal generated from an output signal of the active pixel;
  performing an automatic dark level compensation of the active signal by applying a pedestal to the active signal, wherein a pedestal level of the pedestal that is applied to the active signal is compensated to account for the dark level difference error and the pedestal level offset; and
  generating the active signal from the output signal of the active pixel by performing a correlated double sampling on the output signal of the active pixel,
  wherein generating the active signal from the output signal further comprises comparing the correlated double sampled output signal of the active pixel and a ramp voltage to produce a comparison result, and outputting the comparison result to a counter.

* * * * *